United States Patent
Boyd et al.

(10) Patent No.: US 6,366,242 B1
(45) Date of Patent: Apr. 2, 2002

(54) COMPUTER WORKSTATION TOOL FOR DISPLAYING PERFORMANCE ESTIMATE OF TAGGED OBJECT GEO-LOCATION SYSTEM FOR PROPOSED GEOMETRY LAYOUT OF TAG TRANSMISSION READERS

(75) Inventors: Robert W. Boyd, Rogersville, TN (US); David J. Stryker, Palo Alto, CA (US); Donald K. Belcher, Rogersville, TN (US)

(73) Assignee: Wherenet Corporation, Santa Clara, CA (US)

( * ) Notice: Subject to any disclaimer, the term of this patent is extended or adjusted under 35 U.S.C. 154(b) by 0 days.

(21) Appl. No.: 09/626,021

(22) Filed: Jul. 27, 2000

Related U.S. Application Data (63) Continuation-in-part of application No. 09/442,710, filed on Nov. 19, 1999, now Pat. No. 6,121,926, which is a continuation of application No. 09/239,399, filed on Jan. 28, 1999, now Pat. No. 5,995,046, which is a continuation-in-part of application No. 08/786,232, filed on Jan. 21, 1997, now Pat. No. 5,920,287.
(60) Provisional application No. 60/073,254, filed on Jan. 30, 1998.

(51) Int. Cl.[7] ............................................. G01S 3/02
(52) U.S. Cl. ...................................... 342/450; 342/451
(58) Field of Search ................................. 342/450, 451

(56) References Cited

U.S. PATENT DOCUMENTS

| | | | |
|---|---|---|---|
| 5,045,860 A | * | 9/1991 | Hodson ....................... 342/451 |
| 5,119,104 A | | 6/1992 | Heller .......................... 342/450 |
| 5,216,429 A | | 6/1993 | Nakagawa et al. .......... 342/450 |
| 5,583,517 A | | 12/1996 | Yokev et al. ................ 342/457 |
| 5,661,492 A | | 8/1997 | Shoap et al. ................ 342/465 |

* cited by examiner

*Primary Examiner*—Mark Hellner
(74) *Attorney, Agent, or Firm*—Allen, Dyer, Doppelt, Milbrath & Gilchrist, P.A.

(57) ABSTRACT

A reader geometry visualization tool for a geo-location system technician's personal computer is operative to display a map of an asset management environment. The technician interactively places and manipulates a distribution of tag transmission readers and any potential impairments to RF transmissions on the map. The locations of the readers (and any impairments) are coupled as input parameters to a mathematical model of a tag-based geo-location system. The performance of the map-parameterized geo-location system model is then computed as a geometric dilution of precision (gdop) value for the intended object coverage area. The computed (gdop) performance is visually characterized on the displayed map, as by way of different colors to indicate how accurately the proposed reader geometry will enable the system to locate objects anywhere in the coverage area.

17 Claims, 9 Drawing Sheets

COMPUTER WORKSTATION TOOL FOR DISPLAYING PERFORMANCE ESTIMATE OF TAGGED OBJECT GEO-LOCATION SYSTEM FOR PROPOSED GEOMETRY LAYOUT OF TAG TRANSMISSION READERS

CROSS-REFERENCE TO RELATED APPLICATIONS

The present application is a continuation-in-part of U.S. patent application Ser. No. 09/442,710 (hereinafter referred to as the '710 application), filed Nov. 19, 1999, now U.S. Pat. No. 6,121,926 by Donald K. Belcher et al, entitled "Radio Geo-Location System with Advanced First Received Wavefront Arrival Determination," which is a continuation of U.S. patent application Ser. No. 09/239,399, filed Jan. 28, 1999, now U.S. Pat. No. 5,995,046, issued Nov. 30, 1999, which is a continuation in part of U.S. patent application Ser. No. 08/786,232 filed Jan. 21, 1997 now U.S. Pat. No. 5,920,287 assigned to the assignee of the present application and the disclosure of which is incorporated herein. The present application also claims the benefit of U.S. Provisional Patent Application Ser. No. 60/073,254, filed Jan. 30, 1998, entitled: "Radio Geo-Location Technique With Advanced First Wave-front Arrival Determination," by Donald K. Belcher et al, assigned to the assignee of the present application and the disclosure of which is incorporated herein.

FIELD OF THE INVENTION

The present invention relates in general to object location and tracking systems, and is particularly directed to a reader geometry visualization software tool, that may be readily executed on a geo-location system installer's personal computer. The tool is operative to enable the installer to prospectively configure and measure the performance of the geometry layout of a plurality of tag transmission readers of a tagged object radio geo-location system to be deployed in an asset management environment. The tagged object radio geo-location system may be of the type described in the above-referenced applications.

BACKGROUND OF THE INVENTION

The above-referenced '710 application describes a radio tag-based object location system, that is operative to provide continuous accurate identification and geographical location of a plurality of objects in an asset management environment, such as a warehouse, manufacturing plant, electronic system engineering and testing facility, and the like. For this purpose, as illustrated diagrammatically in FIG. 1, a plurality of tag transmission readers 10 may be installed at relatively unobtrusive locations within and/or around the perimeter of the environment, such as doorway jams, ceiling support structures, etc. The tag emission readers 10 are an asset management environment 12, that contains objects/assets 14, whose location is reported to an asset management data base 20. The data base 20 may be accessible by way of a standard computer workstation or personal computer 26.

Figure 1:
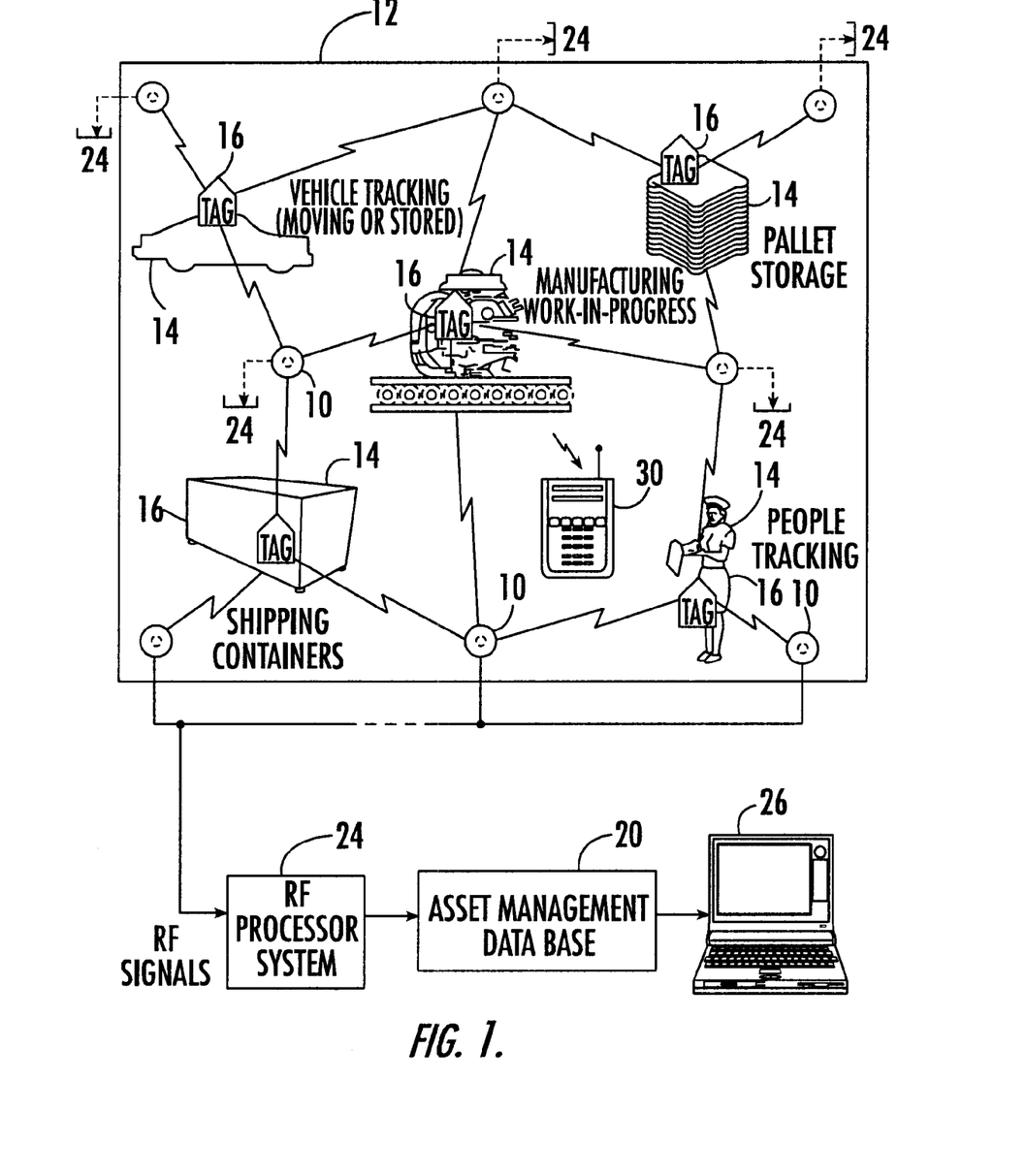
FIG. 1 diagrammatically illustrates the general architecture of a tagged object tracking and location system of the type described in the above-referenced '710 application.

In order to geo-locate an object, each of the readers 10 monitors the environment 12 for transmissions from one or more randomly transmitting tags 16, each of which is affixed to an object to be tracked. The radio transmitter of a respective tag 16 is configured to randomly and repeatedly transmit or 'blink' a short duration, wideband (spread spectrum) pulse of RF energy, which is encoded with information, such as that representative of the identification of the object, and other object-associated information stored in tag memory. By repeatedly transmitting in this manner, the plurality of tags be considered to be akin to a field of random 'blinking' fireflies.

Each tag transmission reader 10 is coupled to an associated reader output processor of an RF processing system 24, which is operative to correlate the spread spectrum signals received from a tag with a set of spread spectrum reference signal patterns, in order to determine which spread spectrum signals received by the reader is a first-to-arrive spread spectrum signal burst transmitted from the tag. First-to-arrive signals extracted by the reader output processor from the signals supplied from a plurality of readers 10 are coupled to an object location processor, within the RF processor system 24. The object location processor is operative to execute time-of-arrival differentiation of the detected first-to-arrive transmissions, and thereby locate the tagged object.

One of the key performance drivers in configuring and installing such a radio tagged object geo-location system is the proper placement of the tag transmission readers. Even where a system layout technician is provided with guidelines of where to distribute the readers, it would be preferable to have a priori knowledge of the likelihood of success and cost of the layout design.

SUMMARY OF THE INVENTION

In accordance with the present invention, this objective is successfully addressed by a software-based visualization tool, that may be readily executed on a technician's personal computer. As will be described, this tool is operative to display a map of the asset management environment. The map contains, or is modified by the geo-location system installer to contain, obstacles or environmental clutter that may impair RF transmissions from tags to a plurality of tag transmission readers that are selectively distributed throughout the map by the installer. The locations of the readers and obstacles are then used to define the parameters of a mathematical model of a tag-based geo-location system, such as that described in the '710 application, for monitoring tagged objects in the monitored environment.

In order to provide the designer with a 'picture' of the line of sight coverages relative to respective readers of a given reader placement geometry, a 'show reader visibility' subroutine may be invoked prior to computing and displaying the performance of the map-parameterized geo-location system. This subroutine performs a 360° line-of-sight ray tracing operation from each proposed reader toward the outer boundaries of the environment. Any ray emanating from a reader and encountering an obstacle is truncated at its intersection with the obstacle. The truncated rays are displayed as colored lines, to create a differentially colored map overlay.

This differentially colored map overlay contains colored regions emanating from the readers toward the perimeter of the map, and uncolored areas extending from the truncated rays and indicating those portions of the environment that cannot be seen by any reader. If part of the intended coverage area includes any uncolored portion of the map overlay, the designer knows that a change in reader geometry is required. The performance of the mathematical model of the reader geometry-parameterized geo-location system is then computed and displayed on the map. For this purpose, a performance analysis subroutine estimates the accuracy to which a tag located anywhere within the coverage area of the proposed reader layout can be geo-located by the system.

In accordance with a non-limiting but preferred embodiment, the performance estimate is computed as a geometric dilution of precision (gdop) value for the intended coverage area. The gdop operates on the principle of assessing the first derivative of location with respect to differential time-of-arrival associated with various reader combinations. The absolute value of this derivative may is classified with respect to thresholds associated with respectively different degrees of performance, as will be described. The resulting performance estimate of the proposed reader geometry layout is visually characterized on the displayed map, as by way of added hatching, different colors, shades of grey, and the like, to indicate the how accurately the proposed reader layout will enable the system to locate tagged objects anywhere in the intended coverage area.

Once presented with a (colorized map) visualization of the estimate of performance of the system model for a proposed reader geometry layout on the displayed map, the user may selectively modify the reader geometry parameters. If the map's performance coloring indicates a less than acceptable accuracy, the user may reconfigure the reader geometry layout for further performance analysis. This interactive sequence is repeated until the designer is satisfied with the predicted performance of the system for the proposed reader geometry as displayed on the (color-coded) map. A site file is then saved for subsequent resource allocation evaluation.

DETAILED DESCRIPTION

Before detailing the reader geometry visualization tool described briefly above, it should be observed that the invention resides primarily in a software routine that may be installed and executed on a user workstation, such as a personal computer. As such, the invention will be described with reference to a flow chart that delineates the respective steps of the tool, together with an associated set of reduced complexity reader coverage maps that are displayed on the user's computer workstation in the course of execution of the tool. As pointed out briefly above, the displayed maps not only depict characteristics (including transmission impairments or obstacles) of the environment for which a multi-reader radio geo-location system is to be designed, but display the effects of interactive user adjustments to the reader deployment geometry on the predicted performance of the system.

The layout of tag transmission readers and other components of the geo-location system layouts have, therefore, been illustrated in a readily understandable block diagram format, so as not to obscure the disclosure with details which will be readily apparent to those skilled in the art having the benefit of the description herein. Thus, the steps of the flow chart, associated maps and block diagram illustrations are primarily intended to show the major components of the reader geometry visualization tool and a radio geo-location system defined thereby, in a convenient system grouping, whereby the present invention may be more readily understood.

For purposes of providing a non-limiting example, the asset management environment to which the reader geometry visualization tool of the invention is to be applied will be the interior floor space of a parts storage warehouse. As diagrammatically shown in the plan view of FIG. 2, the storage warehouse floor space 200 may be exteriorly bound by a generally rectangular perimeter wall 201, with an additional interior wall 202 extending generally through the middle of the warehouse, and effectively dividing a parts storage floor space into two adjacent rectangular regions 206 and 208. Each object 210 on either of the two floor space regions corresponds to a pallet of boxed parts, and has an attached radio tag 212 of the type described in the above-referenced '710 application.

Figure 2:
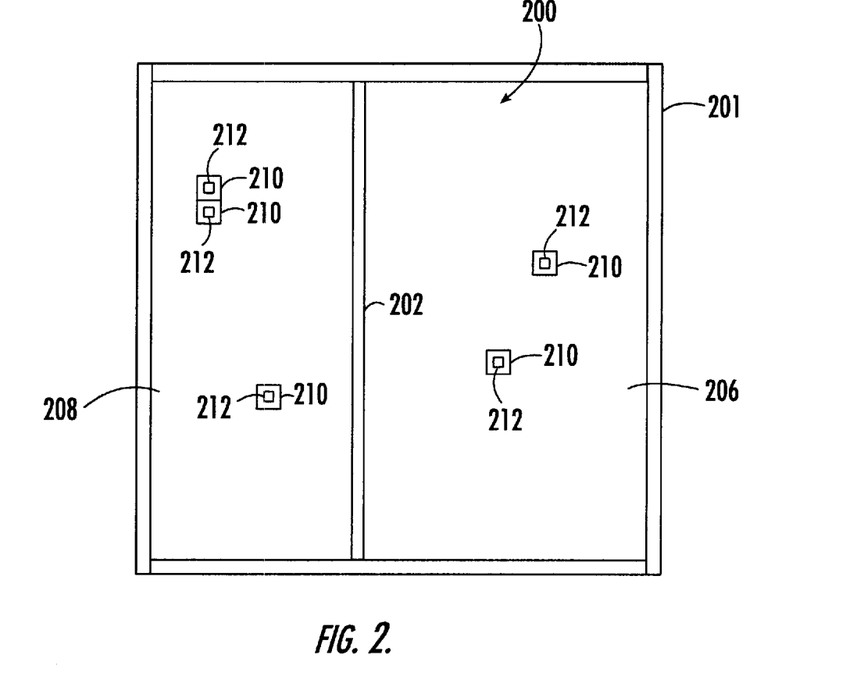
FIG. 2 diagrammatically shows the interior floor space of a warehouse as an example of an asset management environment to which the reader geometry visualization tool of the invention may be applied.

For the indoor application of the present example, each radio tag 212 has some nominal effective transmission range (e.g., on the order 300–400 ft.) for the sensitivity of a tag transmission reader, and the RF transmission obstruction density (environmental clutter in the RF transmission path) associated with the monitored area of interest. For the interior of a warehouse, obstruction density may include building material, such as support columns, catwalks, ductwork, wiring, mechanical assemblies, etc. In an outdoor application, on the other hand, such as automobile storage lot, as a non-limiting example, the effective transmission range of a tag will generally be higher, due to the relatively low obstruction density associated with the 'openness' of the monitored environment.

As described briefly above, one of the tasks of a system installer is to configure a distribution of (at least three) tag transmission readers around and/or within the working boundaries of the coverage area (here warehouse storage floorspace), that will enable the geo-location system to geographically locate each and every tagged object (pallet) to a prescribed accuracy. While not part of the present invention, prior to beginning this exercise, the user may be given a set of reader geometry guidelines, including those discussed below, that will facilitate the designer's interactive participation with the reader geometry visualization tool.

Figure 3:
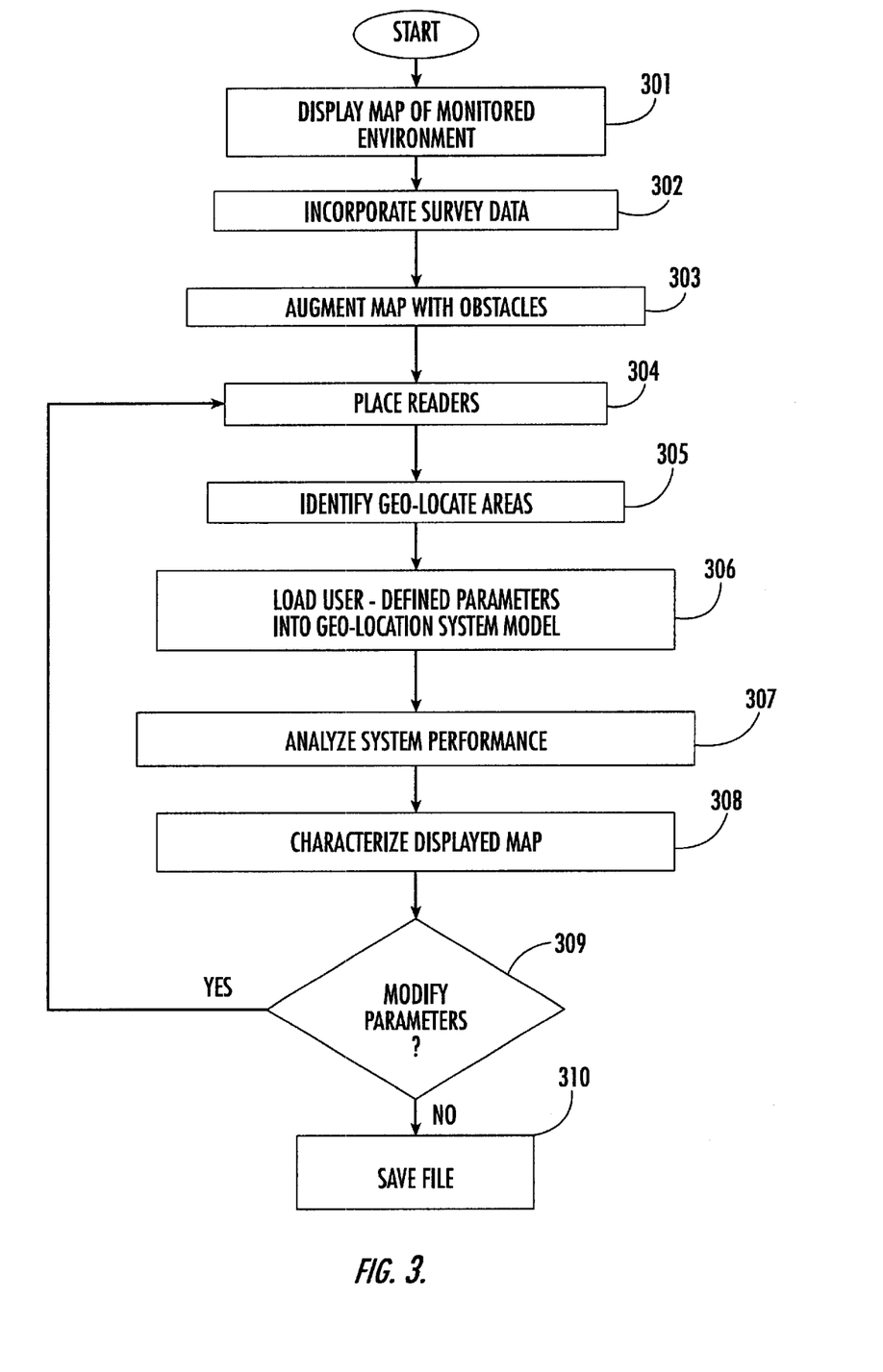
FIG. 3 is a flow chart of respective steps carried out by the reader geometry visualization routine of the present invention.

Attention is now directed to FIG. 3, which is a flow chart of the respective steps carried out by the reader geometry visualization routine of the present invention. Associated with FIG. 3 are FIGS. 4–14, which are maps of a variety of reader deployment geometries for a number of asset management environments (including maps associated with the divided warehouse floor space areas of FIG. 2), that may be realized by the visualization software tool of FIG. 3. As will be described, the maps contain shaded regions that indicate the ability of a geo-location system of the type described in the above-referenced '710application to accurately geo-locate tags located anywhere within the reader coverage area.

As shown at step 301 in the flow chart of FIG. 3, once invoked, the initial task performed by the reader geometry visualization tool of the invention is to display a geographic map of the monitored environment. Such a map may be obtained from a previously stored, computer aided design (CAD), windows-based, metafile, and may include various cultural details superimposed on a standard LAT/LONG geographic grid of the coverage area of interest. For the reduced complexity example of the warehouse of FIG. 2, FIG. 4 shows a rectangular coordinate system (x,y) based gridwork of points 401 superimposed on a map of the warehouse floor space 200.

Figure 4:
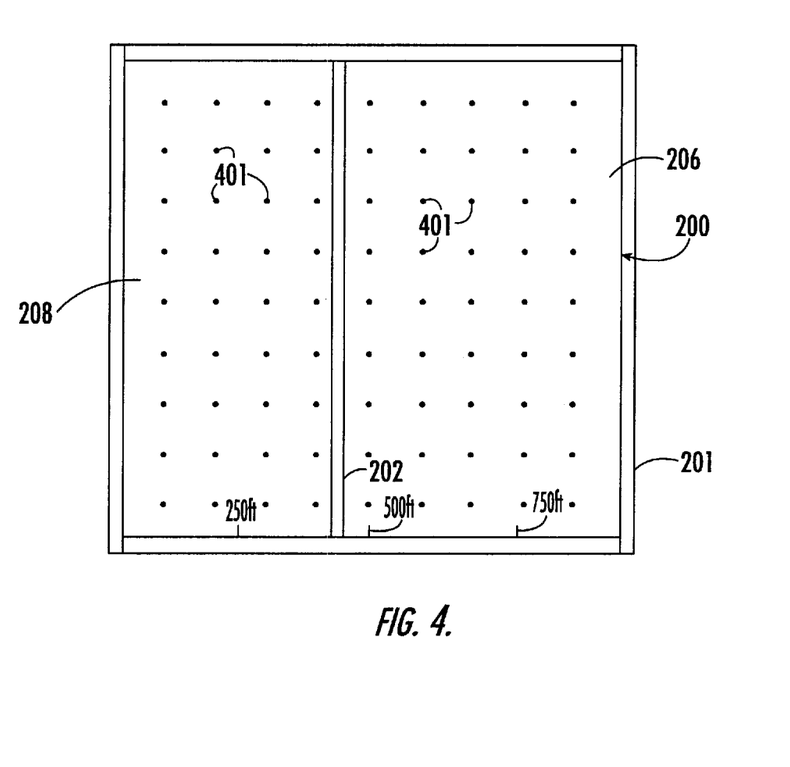
FIG. 4 shows a gridwork of points superimposed on a map of the warehouse floor space of FIG. 2.

If the map of the asset management environment of interest has not been previously scaled in accordance with survey data of a given accuracy for the required reader sensitivity resolution of the geo-location system, then, as shown at step 302, survey-based scaling information from a separate file may be incorporated into the displayed map to scale the dimensions of the map (e.g., in increments of 250 ft. as shown in FIG. 4). This survey reference scaling of the map is necessary to minimize errors in the prediction of system performance in terms of the actual proposed placements of tag transmission readers by the layout designer.

Once the geography data within the map has been dimensioned in terms of a given survey data reference, the user is prompted in step 303 to augment the map (as by way of a standard mouse-controlled point/drag and click of a polygon on the displayed map such as derived from a one or more menu-listed items) with the locations and shapes of any signal degradation artifacts or obstacles, that are currently not shown and which pose potential impairments to the successful reader reception of RF transmissions from the tags. In the present example, such a signal degradation artifact corresponds to the dividing wall 202, shown as a generally rectangular polygon that extends through the middle of the warehouse, and divides the floor space 200 into the two adjacent rectangular regions 206 and 208, as described above. In addition to defining size and shape of the obstruction(s), the user may also provide elevation/height data associated with the obstruction(s), since each of the readers will be located at some height relative to the monitored area, so that various look angles to the objects being monitored by the readers will include elevation (z-axis) components.

Next, in step 304, the user is prompted to place on the map a plurality of readers, relative to the coverage area of interest. From a practical standpoint, and in the present warehouse example of FIGS. 2 and 4, the geographic parameters available to the user are confined to being along the perimeter 201 of and within the area of coverage (floor space regions 206 and 208). This limited reader placement capability is customarily the case for an indoor facility, where (exterior and any interior) walls of the building constitute impairments to acceptable reader reception of tag transmissions from within the coverage area.

Figure 5:
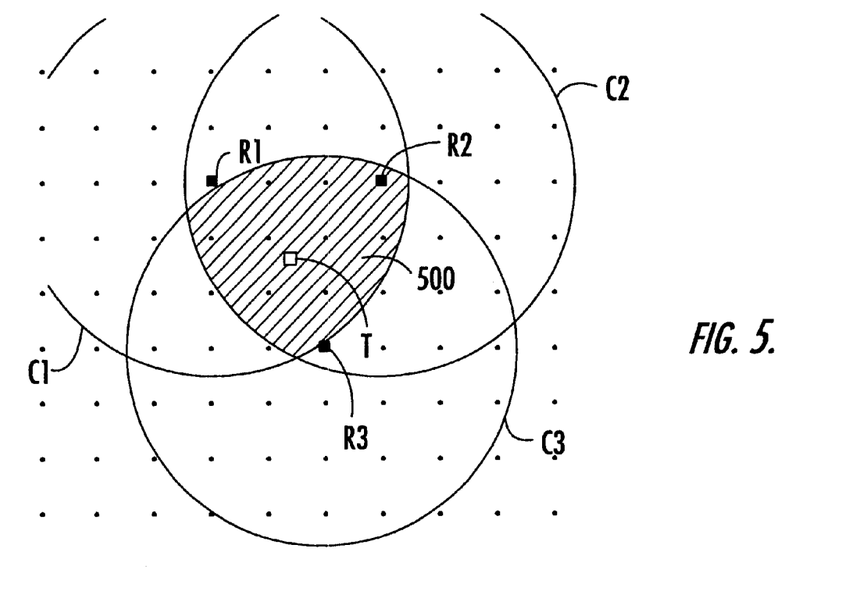
FIG. 5 shows a two dimensional distribution of three readers surrounding a tag.

As pointed out above, although not part of the present invention, the user may be various reader layout guidelines, that facilitate the designer's choices in the placement of readers. For example, FIG. 5 shows a two dimensional distribution of three readers R1, R2 and R3, having respective reader-to-tag transmission sensitivity ranges denoted by circles C1, C2 and C3. In this non-limiting example, as long as a tag T is located within the shaded region 500 bounded by all three circles, an RF transmission from the tag will be received by all three readers, and thereby enable time-of-arrival triangulation on the received signals, such as that employed in the '710 application, to accurately geo-locate the tag.

Figure 6:
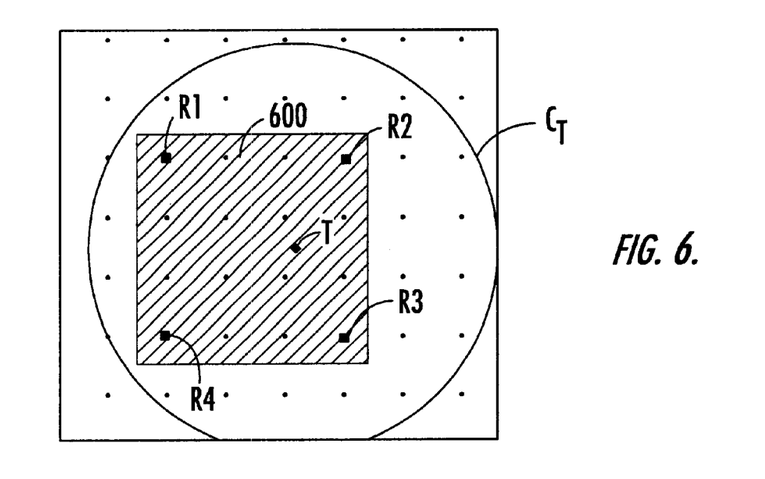
FIG. 6 shows a generally square distribution of four readers surrounding a tag.

FIG. 6 shows a further non-limiting example of a two dimensional (here, generally square) distribution of four readers R1, R2, R3 and R4 relative to a tag T, whose reader-to-tag transmission sensitivity range is denoted by circle $C_T$. The shaded region 600 represents the accurate geo-location coverage area for the illustrated, generally square four reader distribution. It can be seen that as long as the tag is located within the perimeter of a four reader distribution denoted by shaded region 600, it will be accurately geo-located.

Figure 7:
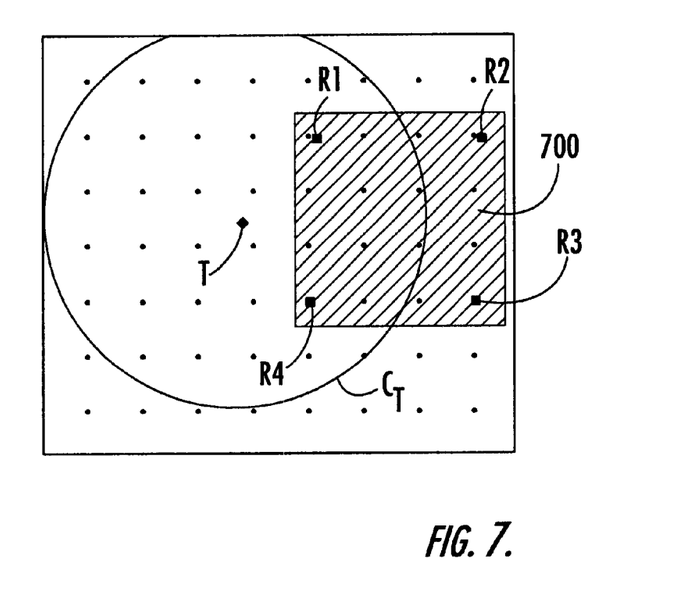
FIG. 7 shows a tag outside the perimeter of the generally square distribution of readers of FIG. 6.

If, however, as shown in FIG. 7, the tag T is located outside the perimeter of the reader distribution, denoted by the shaded region 700, an RF transmission from the tag T will be received by only two of the four readers R1–R4, and thereby prevent accurate geo-location of the tag. Thus, placing a reader at each corner of a rectangle will readily provide geo-location coverage for an area where the diagonal distance is less than the tag-to-reader sensitivity range (denoted by circle $C_T$). For a slightly larger rectangular distribution, an additional reader may be added at the center of the rectangle, so long as the maximum acceptable tag-to-reader separation is not exceeded.

Figure 8:
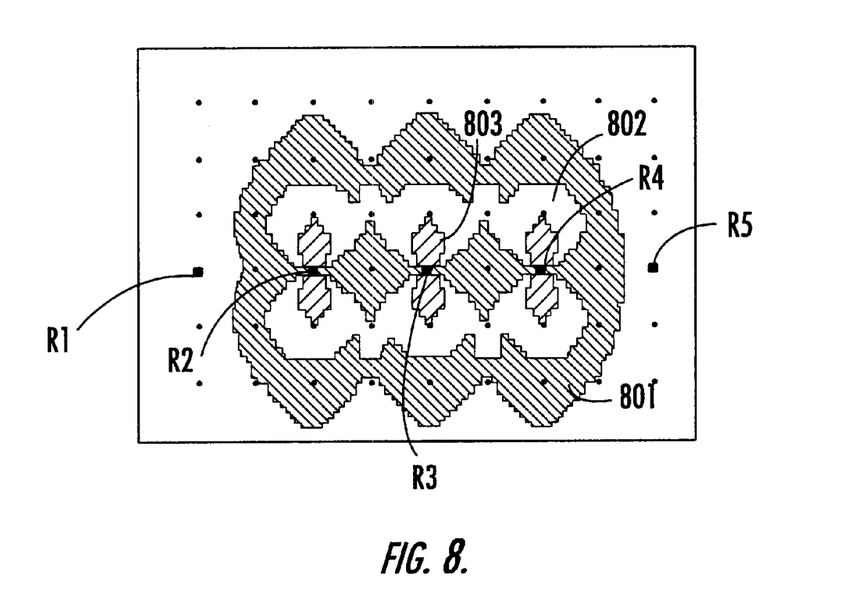
FIG. 8 shows the inability of a one dimensional reader distribution to provide complete coverage of an immediately adjacent area.

FIG. 8 shows the inability of a one dimensional reader distribution to provide complete coverage of an immediately adjacent area. Here, there are five readers R1, R2, R3, R4 and R5, that produce a composite geo-location pattern 800 having differently shaded regions 801, 802 and 803, associated with different degrees of geo-location accuracy. It can be seen that the geometry of a one-dimensional reader distribution (even though containing at least three readers) leaves gaps in the desired coverage. Factors that can contribute to this reduced coverage include, for example, the fact that line-of-sight angles from a tag to one or more readers in a one-dimensional geometry may be too acute, in contrast with those of a two-dimensional reader distribution, particularly one whose perimeter surrounds a tag. For the one dimensional layout of FIG. 8, a tag must be located in the complex shape of the dark shaded region 801, in order to be accurately geo-located. If a tag is located in the light shaded region 802 (even though very close to a reader) its location will be uncertain, whereas if a tag is located in the medium shaded region 803 (which may again be very close to a reader), its geo-location accuracy is very poor. Thus, a one-dimensional reader geometry will produce unacceptable results.

Figure 9:
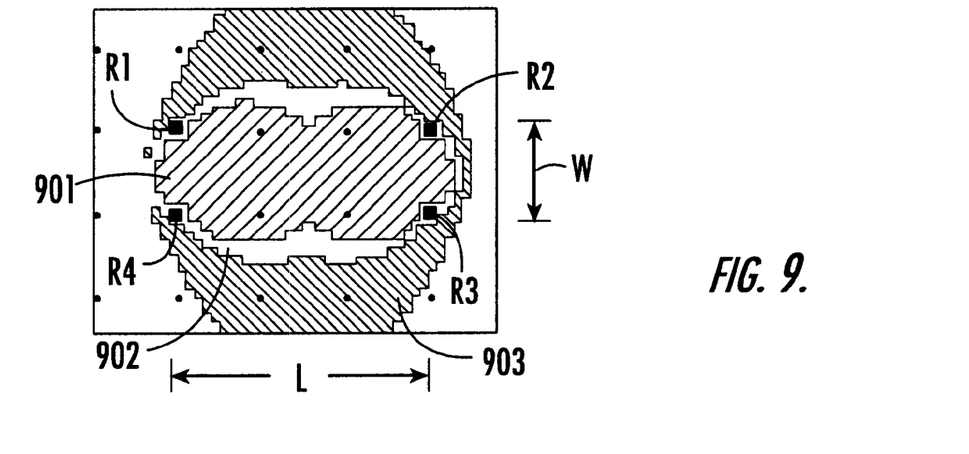
FIG. 9 shows the geo-location coverage provided by four readers arranged in a generally rectangular pattern.

FIG. 9 shows the geo-location coverage provided by four readers RI, R2, R3 and R4 arranged in a generally rectangular pattern of a width W and a length L. As long as the aspect ratio W/L is less than 3:1 and the maximum tag-to-reader transmission range is not exceeded, a tag located anywhere within the perimeter of the rectangular pattern will be accurately geo-located, as denoted by the shaded area 901 that encompasses the entire area bounded by the perimeter of the four readers. The light shaded region 902 associated with uncertain geo-location borders the sides of the rectangular pattern, whereas the outer shaded region 903, where a tag location accuracy is very poor extends substantially outwardly from the longer sides of the rectangular pattern.

Figure 10:
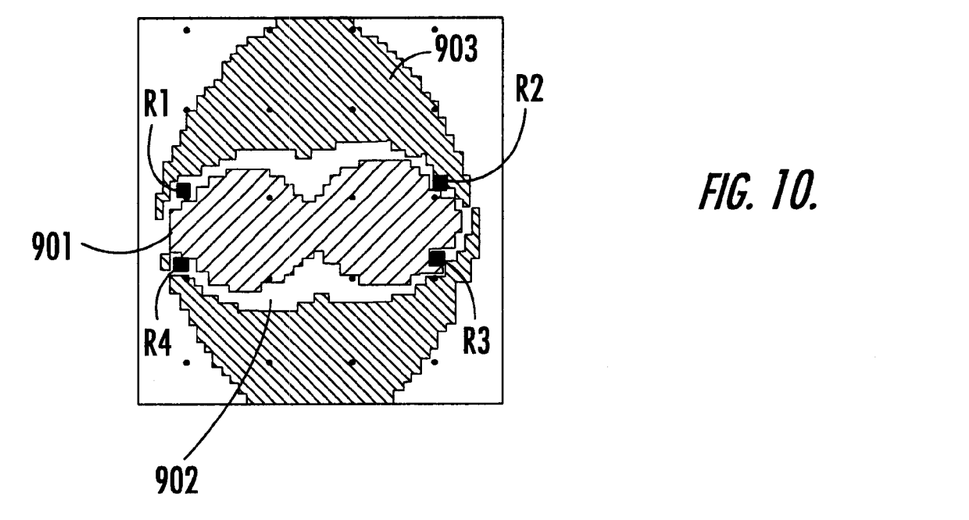
FIG. 10 shows that increasing the aspect ratio of the rectangular pattern of FIG. 9 degrades its geo-location coverage.

FIG. 10 shows that increasing the aspect ratio of the rectangular pattern of FIG. 9 degrades the geo-location coverage within the rectangular pattern, mandating the addition of one or more readers.

It should be observed that FIGS. 5–10 are intended as non-limiting examples of reader deployment diagrams, which may be used to acquaint a tool user with various geometry relationships that will the facilitate the system designer's placement and arrangement of readers in a deployment geometry that will initially achieve or come close to realizing accurate geo-location of any tag within the intended area of coverage. Still, as pointed out above, the reader geometry visualization tool of the invention does not require any a priori knowledge or skill by the user. Its function is to analyze reader deployment information that is interactively supplied by the user to a map display of a reader coverage area, and then characterize (e.g., color-code) the displayed map in accordance with the predicted performance of the geo-location system using the prospective reader geometry layout.

Figure 11:
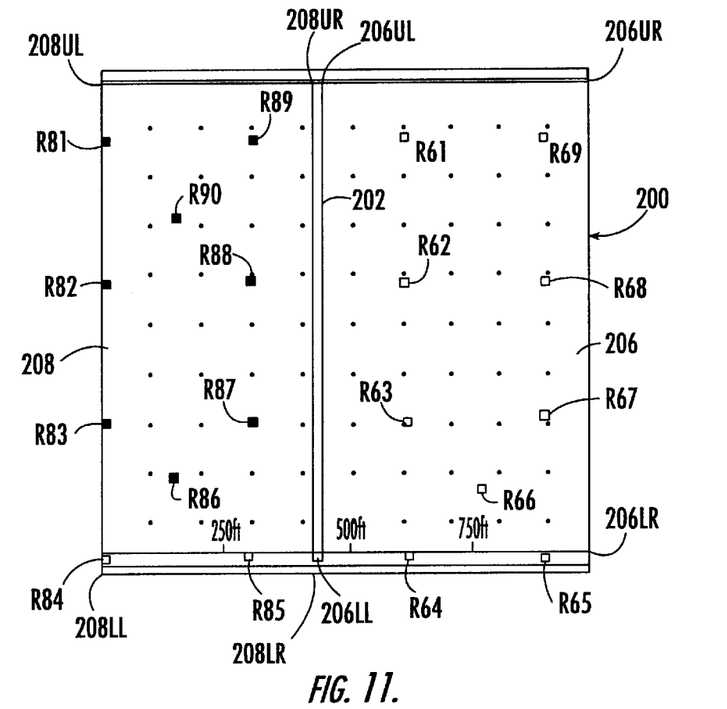
FIG. 11 diagrammatically illustrates the warehouse map of FIG. 4 with a superimposed distribution of readers.

FIG. 11 diagrammatically illustrates the warehouse 5 map of FIG. 4, upon which the reader deployment designer has placed a first, two-dimensional distribution of readers R61–R69 in the rectangular region 206, and a second, two-dimensional distribution of readers R81–R90 in the rectangular region 208, in response to the prompt of step 304 in the flow chart of FIG. 3.

Once the reader layout designer indicates that he has finished placing obstacles and readers on the displayed coverage area of interest, the routine then transitions to step 305. In step 305, the user is prompted to outline one or more 'locate' areas or regions within the displayed map.

A 'locate' area is that portion of the displayed environment, for which the geo-location system is expected to be able to accurately geo-'locate' each and every tagged object, as long as the object is within the locate area. A locate area may be specified by clicking on vertices of a polygon proscribing the coverage area of interest. In the present example, the user may specify the four vertices (corners) 206UL, 206LL, 206LR and 206UR of the rectangular region 206 and the four vertices (corners) 208UL, 208LL, 208LR and 208UR of rectangular region 208 in the displayed map.

At this point, the user may modify any of the information supplied to the map, including relocating or changing the number of readers, obstructions, coverage area, etc., prior to applying the map information to a system performance analyzer in step 306. In step 306, all of the map information defined up through step 305 is applied to a system performance analyzer subroutine 307.

Pursuant to this subroutine, a previously stored mathematical representation or model of a tagged object radio geo-location system, such as that described in the above-referenced '710 application, is accessed from memory and configured with the proposed reader geometry and map parameter data defined in step 305. The performance analysis subroutine of step 307 estimates the accuracy to which a tag located anywhere within the coverage area of the proposed reader geometry map can be geo-located by the modelled system.

In accordance with a non-limiting but preferred embodiment, the performance estimate is computed as a geometric dilution of precision (gdop) value for the intended reader coverage area. As described above, the gdop operates on the principle of assessing the first derivative of location with respect to differential time-of-arrival associated with various reader combinations. The absolute value of this derivative may then be classified with respect to thresholds associated with respectively different ranges of performance, discussed below.

In step 308, visual characterizations, such as hatching, colors or shades of grey, as non-limiting examples, associated with these ranges are then used to selectively characterize (e.g., color-code) the map coverage area currently being displayed to the user. As a non-limiting example, a relatively low gdop value (e.g., falling within a range of from 1.0 to 1.5) may have an associated green color code; a low to medium gdop value (e.g., falling within a range of from 1.5 to 3.0) may have a yellow color code; and a medium to high gdop value (e.g., above 3.0) may have a red color code. In addition to areas outside the reader perimeter, this would typically include a location directly beneath a reader or in an area having a relatively poor geometric relationship (e.g. obstructed line-of-sight) relative to a reader.

Figure 12:
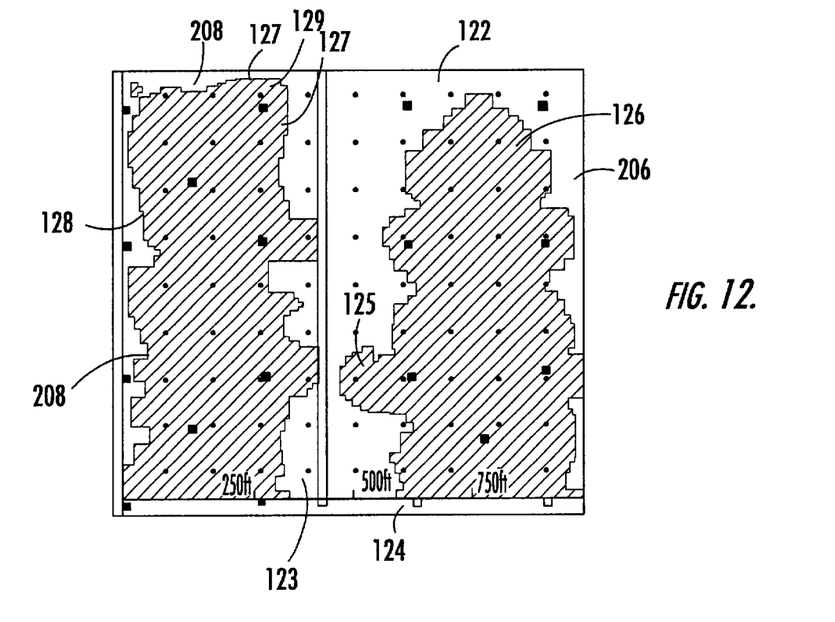
FIG. 12 diagrammatically illustrates a display of the performance of a geo-location system for the reader geometry of the warehouse map of FIG. 11.

FIG. 12 diagrammatically illustrates the warehouse map of FIG. 11 that has been performance-characterized in step 308. In conformity with the above examples, the relatively large shaded regions 126 and 128 (which may be associated with the color green) indicate those portions of respective regions 206 and 208 where the value of gdop is a relatively low (e.g., falling within a gdop range of from 1.0 to 1.5), so that a tag in this region can be expected to be very accurately geo-located. Regions 125, 127 (which may be associated with the color yellow) indicate those portions of regions 206 and 208 where the value of gdop falls within a gdop range of from 1.5 to 3.0; corner regions 124, 129 (which may be associated with the color red) indicate where in regions 206 and 208 the value of gdop is greater than 3.0—associated with a very poor geo-location accuracy. The uncolored areas 122, 123 of regions 206 and 208, which are not insubstantial for the illustrated example, indicates a complete lack of geo-location coverage. (From the graphical display of FIG. 12, the user knows that his initial choice of reader placements is inadequate and must be modified.) Once presented with a (colorized map) visualization of the estimate of performance of the system model for the given reader geometry layout on the displayed map, the user is next prompted in query step 309 as to whether the reader geometry parameters are to be modified. If the answer to query step 309 is NO (which is not the case for the current example), the routine transitions to step 310, wherein user is prompted to save a 'site' file that will contain the map and the parameter data of its associated displayed reader geometry for the coverage area of the monitored environment of interest. This site file is then available for subsequent evaluation for resource allocation efficiency by system design engineering personnel.

If the answer to query step 309 is YES (which is the case in the present example), the routine returns to step 304, wherein the user is prompted to (re)configure the reader geometry layout, relative to the coverage area of interest. The subsequent steps 305–309 described above are then carried out for the modified reader geometry. This interactive sequence is repeated until the user becomes satisfied with the predicted performance of the system as displayed on the (color-coded) map. A site file is then saved in step 310 for subsequent resource allocation evaluation.

Figure 13:
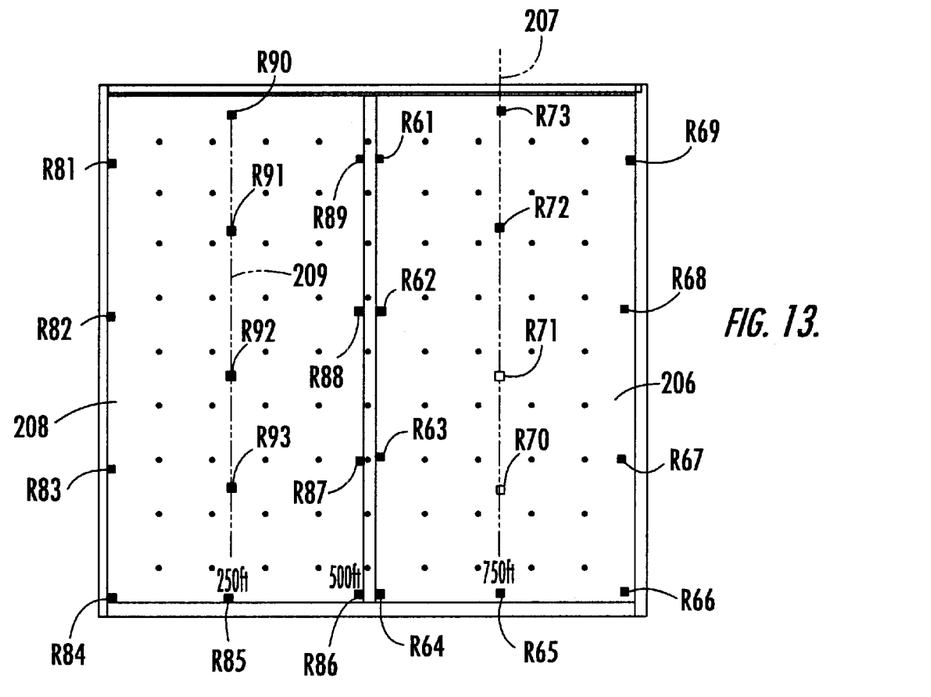
FIG. 13 diagrammatically illustrates a modification of the reader geometry of the map of FIG. 11.

FIG. 13 diagrammatically illustrates the warehouse map of FIG. 4, in which the designer has modified the reader layout of FIG. 11, by adding four more readers R70–R73 to region 206 and three more readers R91–R93 to region 208. The 13 readers R61–R73 of region 206 are now distributed so that they include readers placed along its walls and a center line 207; similarly, the 13 readers R81–R93 of region 208 are distributed to include readers placed along its walls and a center line 209.

Figure 14:
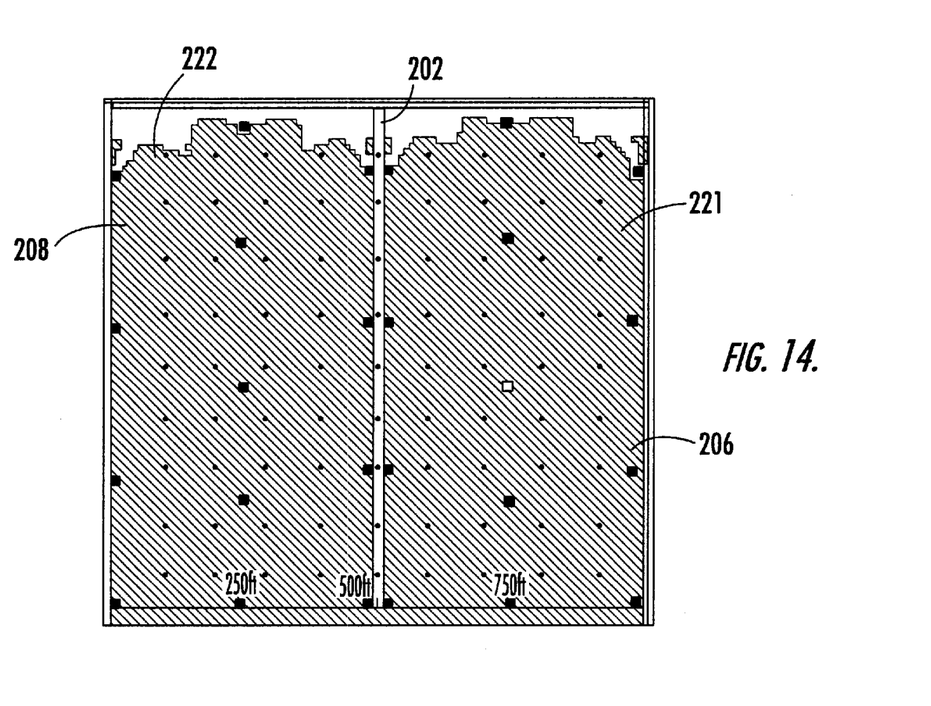
FIG. 14 diagrammatically illustrates a display of the performance of a geo-location system for the modified reader geometry of the warehouse map of FIG. 13.

FIG. 14 diagrammatically illustrates the warehouse map of FIG. 13 that has been performance-characterized in step 308. As a result of the addition of and redistribution of readers in each region 206 and 208, the relatively large shaded regions 221 and 222 (associated with a relatively low gdop value) are now expanded to substantially the entirety of each of regions 206 and 208, indicating that very good geo-location accuracy will be provided for substantially the entire floor space of the warehouse, in spite of the presence of the interior wall 202.

As described above, as a precursor to placing readers on the map of the geo-location environment of interest, the system designer is prompted to augment the map with the locations and shapes of any obstacles (not currently displayed) that pose potential impairments to the successful reader reception of RF transmissions from the tags. As further shown at step 310 in the flow chart of FIG. 3, in order to provide the designer with a 'picture' of the line of sight coverages relative to respective readers of a given reader placement geometry, a 'show reader visibility' subroutine may be invoked prior to computing and displaying the performance of the map-parameterized geo-location system. This subroutine performs a 360° line-of-sight ray tracing operation from each proposed reader toward the outer boundaries of the monitored environment.

Figure 15:
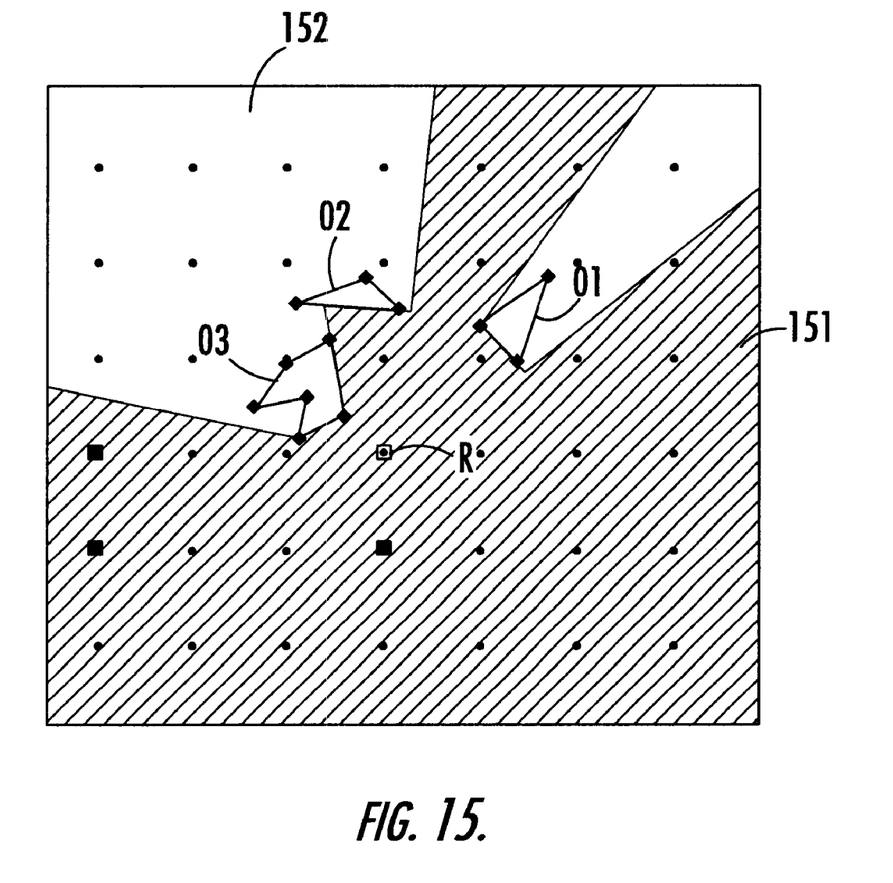
FIG. 15 diagrammatically illustrates a differentially shaded map overlay of obstacle-truncated line-of-sight rays emanating from readers to the perimeter of a map.

As shown in FIG. 15, for a respective reader R, any ray emanating therefrom and encountering one or more obstacles, three of which are shown at O1, O2 and O3, is truncated at its intersection with the obstacle. By displaying the rays as colored lines on the map, what results is a differentially colored (here shaded) map overlay, containing a shaded region 151 emanating from the readers R toward the perimeter of the environment, and uncolored areas 152 extending from the obstacles Oi to the perimeter, and indicating those portions of the environment that cannot be seen by any reader. If part of the intended coverage area includes any portion of the uncolored (unshaded) area 152, the designer knows that a change in reader geometry (such as placement of two or more additional readers) is required.

It should also be noted that a low gdop characterization (e.g., 'solid green' coloration) of the entire reader coverage area will not necessarily indicate that the reader geometry does not require modification. As pointed out previously, a principal factor in the successful design and deployment of a system is cost. While gdop could be relatively easily minimized (e.g., to a value less than 1.0) for the entire coverage area by a brute force approach of densely distributing a relatively large number of readers along the exterior perimeter, along interior boundaries, and throughout the coverage area therebetween, doing so could be expected to produce a prohibitively expensive system.

The design technician may typically attempt to provide acceptable gdop performance for the monitored environment of interest, by starting with a relatively low number of readers (three for example for a very small area), and then rearranging the layout, to the extent possible, before adding a fourth, and so on. However, a designer could readily begin with a larger number of reader locations and then iteratively reduce the number and/or their associated geometrical distribution, as necessary, until further reduction or layout modification yielded a less than satisfactory performance for the geo-location system model.

This flexibility of the design tool of the invention makes it particularly forgiving to an individual who is not expected to be skilled in time-of-arrival based geo-location system processing, but may be someone such as a plant manager, who is relatively familiar with the environment of interest, and is therefore acquainted with practical locations for installations of readers, as well as attributes of the facility that may constitute impairments to accurate geo-location system coverage.

Once provided with an initial set of rudimentary layout and modification guidelines, such as, but not limited to those described above with reference to the diagrams of FIGS. 5–10, the layout designer can be effectively 'tutored' towards an eventual working reader layout, by observing the changes in color codes in association with the changes introduced to the reader distribution geometry.

As will be appreciated from the foregoing description, by enabling a geo-location system installer to visualize both the configuration and performance of a radio tagged object geo-location system for a proposed reader geometry layout, the present invention not only enables a reader installation designer to configure a reader geometry that achieves intended object location coverage but, by allowing the reader and asset management environment parameters to be modified or 'tuned' prior to installation, the invention can be used to optimize the system from a standpoint of resource allocation and cost.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of operating a computer workstation to configure a system for locating objects within a monitored environment, wherein transmissions from tags with said objects are to be detected at a plurality of spaced apart tag transmission readers for said monitored environment, and outputs of said tag transmission readers are processed by an object location processor to locate a tag and thereby its object within said monitored environment, said method comprising the steps of:

(a) displaying on said computer workstation a map of said monitored environment;

(b) identifying on the map displayed in step (a) potential locations of a plurality of said tag transmission readers;

(c) generating a mathematical model of said system using said potential locations of said plurality of said tag transmission readers identified on said map in step (b);

(d) characterizing, on said map of said monitored environment, the ability of a system represented by said mathematical model generated in step (c) to identify locations of objects within said monitored environment;

measuring the geo-location performance of said system represented by said mathematical model generated in step (c) in terms of a geometric dilution of precision (gdop); and visually characterizing gdop accuracy as an estimate of performance of the system model.

2. A method according to claim 1, wherein step (d) comprises providing coloration of said map to characterize the ability of said system represented by said mathematical model generated in step (c) to identify locations of objects within said monitored environment.

3. A method according to claim 1, further including, in response said displayed map of said monitored environment characterizing a prescribed inability of said system represented by said mathematical model generated in step (c) to identify locations of objects within said monitored environment, the step (e) of modifying said potential locations of tag transmission readers in step (b), and carrying out steps (c) and (d) based upon the modified potential locations of tag transmission readers.

4. A method according to claim 3, wherein step (e) comprises changing the potential locations of tag transmission readers in step (b), and carrying out steps (c) and (d) based upon the changed potential locations of tag transmission readers.

5. A method according to claim 3, wherein step (e) comprises changing the number of potential locations of tag transmission readers in step (b), and carrying out steps (c) and (d) based upon the changed number of potential locations of tag transmission readers.

6. A method according to claim 1, wherein step (b) includes identifying on the map displayed in step (a) one or more impairments to transmissions between tags and said plurality of spaced apart transmission readers.

7. A method according to claim 6, wherein step (b) further includes displaying the extent to which said readers are visible to various locations in said monitored environment.

8. A method according to claim 1, wherein said object location processor is operative to locate said respective tag and its associated object within said monitored environment by carrying out time-of-arrival differentiation of first-to-arrive transmissions from a respective tag as detected by said plurality of tag transmission readers.

9. A method according to claim 1, further including, in response to said displayed map of said monitored environment characterizing a prescribed ability of said system represented by said mathematical model generated in step (c) to identify locations of objects within said monitored environment, the steps of:

(e) evaluating cost of deployment of the system represented by the mathematical model generated in step (c); and (f) selectively modifying said potential locations of tag transmission readers in step (b) in dependence upon the cost of deployment evaluation carried out in step (e), and repeating out steps (c), (d), (e) and (f) based upon the modified potential locations of tag transmission readers.

10. A method of enabling an object location system designer to specify where, relative to a monitored environment, a plurality of spaced apart tag transmission readers of said object location system for identifying locations of objects in said monitored environment are to be placed, wherein transmissions from tags coupled with said objects are to be detected at said plurality of spaced apart tag transmission readers, and outputs of said tag, transmission readers processed by an object location processor to locate a tag and associated its object within said monitored environment, said method comprising the steps of:

(a) causing a computer to display a map of said monitored environment;

(b) operating a computer input/output device to identify potential locations of tag transmission readers on said displayed map;

(c) causing said computer to measure the performance of a mathematical model of said object location system using said potential locations of tag transmission readers identified on said map in step (b);

(d) indicating, on said displayed map of said monitored environment, the ability of said object location system as represented by said mathematical model generated in step (c), to identify locations of objects within said monitored environment; and measuring the geo-location performance of said system represented by said mathematical model in terms of a geometric dilution of precision (gdop), and wherein step (d) comprises visually characterizing gdop accuracy to which said object location system as represented by said mathematical model generated in step (c) is able to identify locations of objects within said monitored environment and estimate performance of the system.

11. A method according to claim 10, wherein step (d) comprises selectively coloring said map to visually characterize said gdop accuracy.

12. A method according to claim 10, further including, in response said displayed map of said monitored environment characterizing a prescribed inability of said system represented by said mathematical model generated in step (c) to identify locations of objects within said monitored environment, the step (e) of modifying said arrangement of potential locations of tag transmission readers in step (b), and carrying out steps (c) and (d) based upon the modified arrangement of potential locations of tag transmission readers.

13. A method according to claim 12, wherein step (e) comprises changing the potential locations and/or quantity of tag transmission readers in step (b), and carrying out steps (c) and (d) based upon the changed potential locations and/or quantity of tag transmission readers.

14. A method according to claim 10, wherein step (b) includes identifying on the map displayed in step (a) one or more impairments to transmissions between tags and said plurality of spaced apart transmission readers.

15. A method according to claim 14, wherein step (b) further includes displaying the extent to which said plurality of spaced apart transmission readers are visible to various locations in said monitored environment.

16. A system for enabling an object location system designer to place, relative to a monitored environment, a plurality of spaced apart tag transmission readers for identifying locations of objects in said monitored environment, wherein transmissions from tags coupled with said objects are to be detected at said plurality of spaced apart tag transmission readers, and outputs of said tag transmission readers processed by an object location processor to locate a tag and associated its object within said monitored environment, said system comprising:

a computer that is controllably operative to display a map of said monitored environment; and an input/output device operation of which by said object location system designer causes said computer to display potential locations of tag transmission readers on said map; and wherein said computer contains a program that is operative to measure the performance of a mathematical model of said object location system using said potential locations of tag transmission readers, and to visually characterize on said displayed map of said monitored environment, the ability of said object location system as represented by said mathematical model to identify locations of objects within said monitored environment; and wherein said program is operative to measure geolocation performance of said system represented by said mathematical model in terms of a geometric dilution of precision (gdop), and to cause said computer to visually characterize gdop accuracy to which said object location system as represented by said mathematical model generated is able to identify locations of objects within said monitored environment.

17. A system according to claim 16, wherein said program is operative to cause said computer to display the extent to which said plurality of spaced apart transmission readers are visible to various locations in said monitored environment.

* * * * *